No. 699,427. Patented May 6, 1902.
J. E. THORNYCROFT.
MOTOR VEHICLE.
(Application filed June 1, 1901.)
(No Model.) 2 Sheets—Sheet 1.
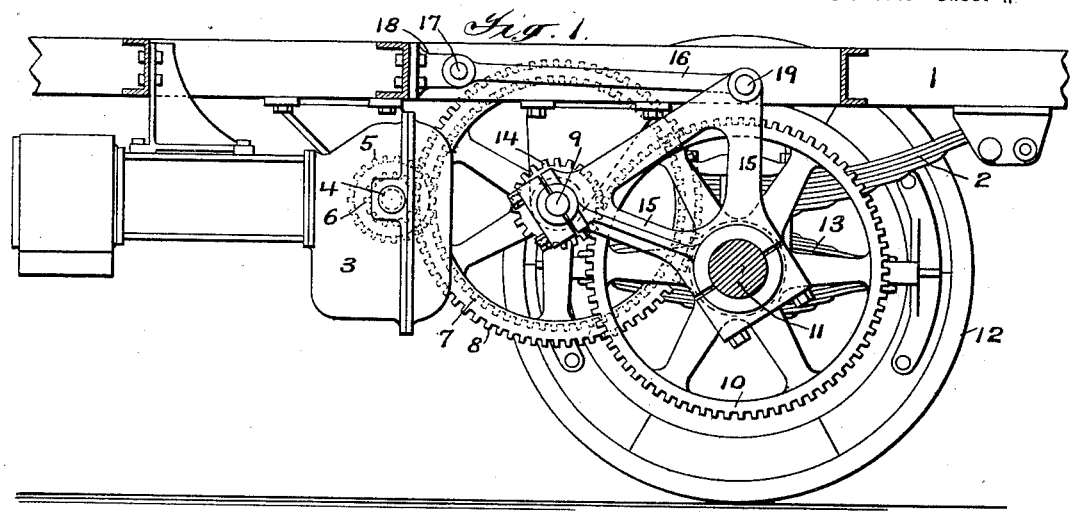
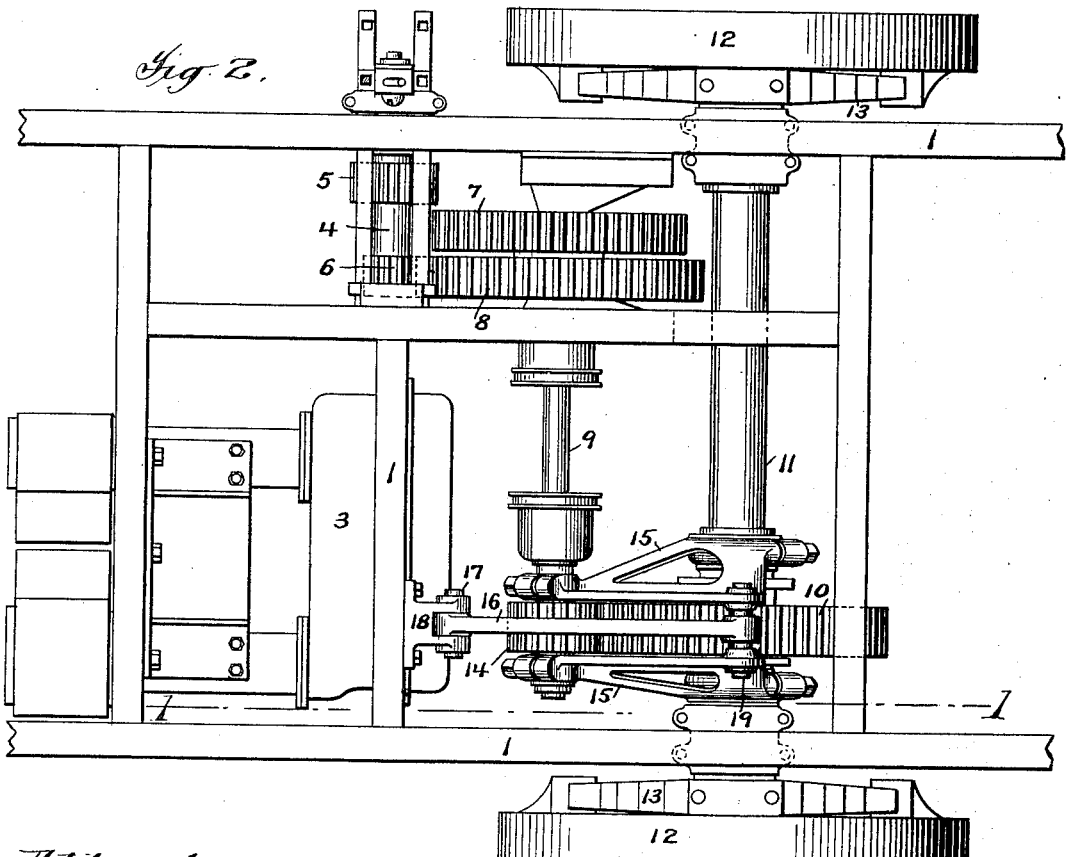

No. 699,427. Patented May 6, 1902.
J. E. THORNYCROFT.
MOTOR VEHICLE.
(Application filed June 1, 1901.)
(No Model.) 2 Sheets—Sheet 2.

UNITED STATES PATENT OFFICE.

JOHN EDWARD THORNYCROFT, OF LONDON, ENGLAND.

MOTOR-VEHICLE.

SPECIFICATION forming part of Letters Patent No. 699,427, dated May 6, 1902.

Application filed June 1, 1901. Serial No. 62,718. (No model.)

*To all whom it may concern:*

Be it known that I, JOHN EDWARD THORNYCROFT, a subject of the King of Great Britain and Ireland, residing at Homefield, Chiswick, London, county of Middlesex, England, have invented certain new and useful Improvements in Motor-Vehicles, fully described and represented in the following specification and the accompanying drawings, forming a part of the same.

This invention relates to certain improvements in driving mechanism for motor-vehicles.

In United States Letters Patent No. 662,206, granted November 20, 1900, there is disclosed a motor-vehicle in which the motor is mounted on a spring-supported frame, said motor serving through proper gearing to drive a power-transmitting gear, which in turn operates a driving-gear for the vehicle, which in the construction shown in said patent is mounted on the rear axle of the vehicle. The vehicle is provided with a rigid perch-frame, which connects its front and rear axles, said perch-frame serving also to support the power-transmitting gear.

The present invention has for its object to improve the driving mechanism of motor-vehicles of the general description shown in said patent by doing away with the perch-frame and providing other means for supporting the power-transmitting gear.

With this and other objects in view the invention consists in certain constructions and in certain parts, improvements, and combinations, as will be hereinafter fully described and then more specifically pointed out in the claims hereunto appended.

Figure 3:
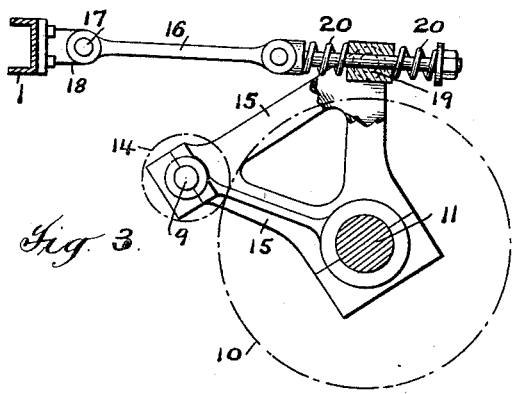
Figure 4:
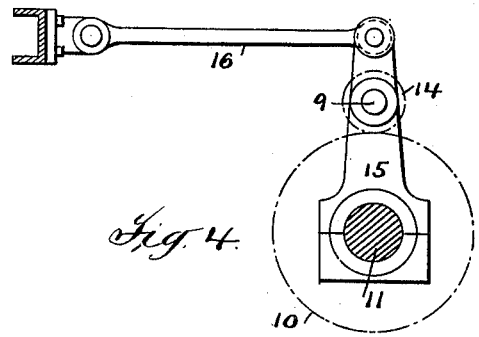
Figure 5:
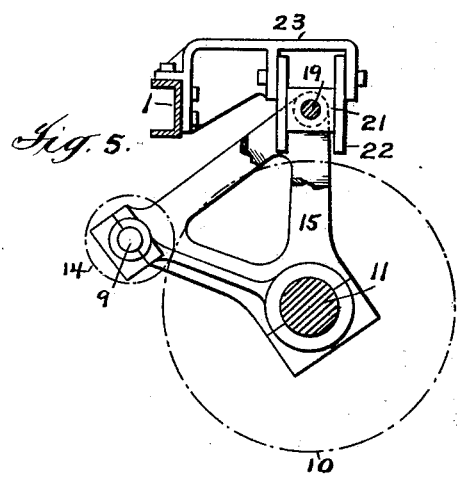

In the accompanying drawings, forming a part of this specification, and in which like characters of reference indicate the same parts, Figure 1 is a side elevation, partly in section, of so much of a motor-vehicle as is necessary to an understanding of the invention. Fig. 2 is a plan view of the rear end of the motor-vehicle provided with the improved driving mechanism. Figs. 3, 4, and 5 are detail sectional elevations illustrating modified constructions.

Referring to the drawings, 1 indicates the frame of the vehicle, said frame being supported on springs 2, which may be of any suitable or desired description, leaf-springs being shown. This spring-mounted frame 1 supports a motor, which may be of any suitable description, said motor being indicated at 3. In the preferred construction this motor will be driven from a suitable steam-engine. The motor-shaft is indicated at 4, said shaft being provided with pinions 5 and 6, which may be arranged to mesh with gears 7 and 8, respectively, these gears and pinions being arranged to vary the speed of the vehicle. While any suitable arrangement of devices may be employed to move the pinions 4 and 5 into and out of mesh with their respective gears and to lock them in position, the construction will preferably be that disclosed in my Patent No. 662,206, before referred to. Inasmuch as the present invention has no relation to this speed-changing gearing, a full description of the same is unnecessary; but such a description may be had by reference to said patent.

The gears 7 and 8 preferably operate to drive a flexible shaft 9, which also may be of any desired construction. Preferably, however, the construction of this shaft will be that described in the patent above referred to, reference to which is made for a full disclosure of the construction.

A suitable driving-gear is provided for the vehicle. While this driving-gear may be variously arranged and mounted, it will preferably be mounted on the rear axle of the vehicle. In the construction shown the driving-gear is marked 10 and the rear axle of the vehicle, to which the gear is rigidly secured, is marked 11. The driving-wheels 12 of the vehicle are preferably driven from the axle through intermediate springs 13, the construction employed being preferably that disclosed in the patent before referred to. The driving-gear 10 is preferably driven from the power-shaft by means of a power-transmitting gear. In the construction shown this power-transmitting gear is marked 14, and it is mounted on one end of the flexible shaft 9. It may be here remarked that the gears 7 and 8 are secured to the other end of the flexible shaft 9, and that end of the shaft which carries these gears is preferably supported by the spring-mounted frame in suitable brackets.

Since the perch-frame, which serves to support the power-transmitting gear in the construction described in the patent above referred to, is omitted in the present construction, other means must be provided for supporting this gear. A suitable bracket is accordingly provided for this purpose, and this bracket in the preferred form of the construction is arranged so that it may, if necessary, have a limited movement about the axis of the driving-gear. While this bracket may be supported in any suitable manner and may be varied in construction, it preferably consists of two arms 15, one of said arms being supported on the axle and the other being supported either on the axle or on the axle-box adjacent to it, so that in either construction the axle either directly or indirectly supports or carries the bracket. In the preferred form of the construction each of the arms of the bracket will be substantially triangular in form, as shown in Figs. 1, 2, and 3, and each of the arms is formed to provide a suitable bearing for the end of the flexible shaft 9, the power-transmitting gear 14 being mounted, in the preferred construction, between the arms of the bracket and on the shaft.

A suitable connection is provided by which the spring-mounted frame controls the position of the bracket with respect to its support—i. e., it steadies the bracket on its support—and is of such a character as to, in so far as possible, prevent the movement of the spring-frame from being transmitted to the bracket. It has already been stated that the bracket in the preferred form of the construction can have, if necessary, a limited movement about its axis. This capacity for a limited movement permits the movement of the spring-mounted frame without producing an undue movement of the bracket and the gear which it supports, for the connection between the spring-mounted frame and the bracket is of a compensating character, so that the full movement of the frame on its springs is not transmitted to the bracket. In the preferred form of the construction this connection consists of a link 16, pivoted to a pin 17, which is mounted in a bearing 18, connected to the spring-frame. At its other end this link is connected to a pin 19, mounted in the arms which form the bracket. With this construction it will be seen that as the spring-frame rises and falls the bracket will be permitted to have a limited movement about its supporting-axis, which, as has been stated, in the preferred construction is the axle of the vehicle. If desired, springs 20 may be interposed between the bracket and its controlling means, (see Fig. 3,) said springs serving to take up any sudden shock or jar.

Instead of employing a bracket which is composed of triangular arms, as shown in Figs. 1 and 2, the arms may, if desired, be of a different configuration. A construction which may be employed is shown in Fig. 4, and these arms may, if desired, be arranged, as in Fig. 4, so that the power-transmitting gear 14 is arranged over the axle of the vehicle.

Fig. 5 illustrates a modification of the means by which the spring-mounted frame controls the position of the bracket. In this form of the construction the pin 19, which connects the bracket-arms, is provided with a block 21, said block engaging guides 22, which are secured to a bracket 23, suitably mounted on the spring-mounted frame 1. In this construction the rise and fall of the spring-mounted frame will take place without producing any movement of the bracket around its supporting axis.

It is to be understood that the means by which the invention is carried into effect may be varied within wide limits. The invention is not, therefore, to be limited to the specific constructions hereinbefore described.

What is claimed is—

1. In a motor-vehicle, the combination with a driving-gear therefor, of a spring-mounted frame, a motor carried by said frame, a train of gearing for transmitting the power from the motor to the driving-gear, a bracket supporting that gear of the train which meshes with the driving-gear, and a compensating connection between the bracket and the spring-mounted frame, substantially as described.

2. In a motor-vehicle, the combination with a driving-gear therefor, of a spring-mounted frame, a motor carried by said frame, a train of gearing for transmitting the power from the motor to the driving-gear, a bracket carried on the vehicle-axle said bracket supporting that gear of the train which meshes with the driving-gear, and a compensating connection between the bracket and the spring-mounted frame, substantially as described.

3. In a motor-vehicle, the combination with a driving-gear therefor, of a spring-mounted frame, a motor carried by said frame, a gear for transmitting power from the motor to the driving-gear, a flexible shaft, a bracket supporting one end of said flexible shaft and transmitting-gear, and a compensating connection between the bracket and the spring-frame, substantially as described.

4. In a motor-vehicle, the combination with a driving-gear therefor, of a spring-mounted frame, a motor carried by said frame, a gear for transmitting power from the motor to the driving-gear, a flexible shaft, a bracket carried on the axle of the vehicle, said bracket supporting one end of said flexible shaft and transmitting-gear, and a compensating connection between the bracket and the spring-frame, substantially as described.

5. In a motor-vehicle, the combination with a driving-gear therefor, of a spring-mounted frame, a motor carried by said frame, a gear for transmitting power from the motor to the driving-gear, a flexible shaft, one end of which is supported by the spring-frame, a bracket supporting the other end of the flexible shaft and the power-transmitting gear, and a compensating connection between the bracket and the spring-frame, substantially as described.

6. In a motor-vehicle, the combination with a driving-gear therefor, of a spring-mounted frame, a motor carried by said frame, a gear for transmitting power from the motor to the driving-gear, a flexible shaft, one end of which is supported by the spring-frame, a bracket carried on the axle of the vehicle, said bracket supporting the other end of the flexible shaft and the power-transmitting gear, and a compensating connection between the bracket and the spring-frame, substantially as described.

7. In a motor-vehicle, the combination with a driving-gear therefor, said gear being mounted on the axle of the vehicle, of a spring-mounted frame, a motor carried by said frame, a gear for transmitting power from the motor to the driving-gear, a flexible shaft, a bracket supporting one end of said flexible shaft and the transmitting-gear, and a compensating connection between the bracket and spring-frame, substantially as described.

8. In a motor-vehicle, the combination with a driving-gear therefor, said gear being mounted on the axle of the vehicle, of a spring-mounted frame, a motor carried by said frame, a gear for transmitting power from the motor to the driving-gear, a flexible shaft, a bracket carried on the axle of the vehicle, said bracket supporting one end of said flexible shaft and the transmitting-gear, and a compensating connection between the bracket and the spring-frame, substantially as described.

9. In a motor-vehicle, the combination with a driving-gear therefor, said gear being mounted on the axle of the vehicle, of a spring-mounted frame, a motor carried by said frame, a gear for transmitting power from the motor to the driving-gear, a flexible shaft, one end of which is supported by the spring-frame, a bracket supporting the other end of the flexible shaft and the power-transmitting gear, and a compensating connection between the bracket and the spring-frame, substantially as described.

10. In a motor-vehicle, the combination with a driving-gear therefor, said gear being mounted on the axle of the vehicle, of a spring-mounted frame, a motor carried by said frame, a gear for transmitting power from the motor to the driving-gear, a flexible shaft, one end of which is supported by the spring-frame, a bracket carried on the axle of the vehicle, said bracket supporting the other end of the flexible shaft and the power-transmitting gear, and a compensating connection between the bracket and the spring-frame, substantially as described.

11. In a motor-vehicle, the combination with a driving-gear therefor, of a spring-mounted frame, a motor carried by the frame, a bracket mounted so as to be movable about the axis of said driving-gear, a flexible shaft driven by the motor, a power-transmitting gear driven by the shaft, one end of said shaft and said transmitting-gear being carried on the bracket, and a compensating connection between the bracket and the spring-frame, substantially as described.

12. In a motor-vehicle, the combination with a driving-gear therefor, said gear being mounted on the axle of the vehicle, of a spring-mounted frame, a motor carried by said frame, a bracket loosely mounted on the axle of the vehicle, a flexible shaft driven by the motor, a power-transmitting gear connected to the shaft, one end of the shaft and said gear being supported in the bracket, and a compensating connection between the bracket and a spring-frame, substantially as described.

13. In a motor-vehicle, the combination with a driving-gear therefor, of a spring-mounted frame, a motor carried by the frame, a train of gearing for transmitting the power from the motor to the driving-gear, a bracket supporting that gear of the train which meshes with the driving-gear, said bracket being mounted so as to be movable about the axis of the driving-gear, and a pivoted-link compensating connection between the bracket and the spring-mounted frame, substantially as described.

14. In a motor-vehicle, the combination with a driving-gear therefor, of a spring-mounted frame, a motor carried by the frame, a train of gearing for transmitting the power from the motor to the driving-gear, a bracket supporting that gear of the train which meshes with the driving-gear, said bracket being mounted so as to be movable about the axis of the driving-gear, a pivoted-link compensating connection between the bracket and the spring-mounted frame, and a spring interposed in said connection.

15. In a motor-vehicle, the combination with a driving-gear therefor, said gear being mounted on the axle of the vehicle, of a spring-mounted frame, a motor carried by the frame, a bracket supported on and movable about the axle of the vehicle, a flexible shaft driven from the motor, a power-transmitting gear, said flexible shaft and transmitting-gear being supported in the bracket, and a pivoted compensating connection between the bracket and the spring-frame, substantially as described.

16. In a motor-vehicle, the combination with a driving-gear therefor, said gear being mounted on the axle of the vehicle, of a spring-mounted frame, a motor carried by the frame, a bracket supported on and movable about the axle of the vehicle, a flexible shaft driven from the motor, a power-transmitting gear, said flexible shaft and transmitting-gear being supported in the bracket, a pivoted-link connection between the bracket and the spring-frame, and a spring interposed in said connection, substantially as described.

17. In a motor-vehicle, the combination with a spring-mounted frame, of a motor carried thereby, a driving-gear for the vehicle mounted on the axle thereof, a bracket supported upon and movable about the axle of the vehicle, a power-transmitting gear, a flexible shaft for driving said transmitting-gear, one end of said shaft and said power-transmitting gear being supported by the bracket and the other end of said shaft being carried in the spring-frame, and a link pivoted to the bracket and to the frame, and forming a compensating connection, substantially as described.

In testimony whereof I have hereunto set my hand in the presence of two subscribing witnesses.

JOHN EDWARD THORNYCROFT.

Witnesses:
PERCY E. MATTOCKS,
WM. O. BROWN.